Sept. 21, 1971     J. F. DYLA     3,606,734
ELECTRO-PRECIPITATION

Filed April 17, 1969     3 Sheets-Sheet 1

JOHN F. DYLA
INVENTOR

BY NORRIS AND BATEMAN

ATTORNEY

JOHN F DYLA
INVENTOR

BY NORRIS AND BATEMAN

ATTORNEY

United States Patent Office 3,606,734
Patented Sept. 21, 1971

3,606,734
ELECTRO-PRECIPITATION
John F. Dyla, Birmingham, England, assignor to Lodge-Cottrell Limited, Birmingham, England
Filed Apr. 17, 1969, Ser. No. 817,103
Claims priority, application Great Britain, May 4, 1968, 21,238/68
Int. Cl. B03c 3/04
U.S. Cl. 55—148           11 Claims

ABSTRACT OF THE DISCLOSURE

An electro-precipitator discharge electrode support structure comprises a first framework adapted to support upper end portions of discharge electrodes of an electro-precipitator electrode bank, a second framework adapted to support lower end portions of the discharge electrodes, and bracing means securing the first framework to the second framework and adapted to minimise relative movement of the frameworks transversely of the bracing means in directions along the bank and across the bank. The bracing means comprises at least one bracing assembly which comprises four parallel straight elongated members extending between the first framework and the second framework and secured to the frameworks; a plurality of aligned annular members are spaced along the straight elongated members and extend transversely thereto; the straight elongated members are secured to each annular member around the periphery thereof and adjacent annular members are interconnected by cross bracing.

---

This invention is concerned with improvements in or relating to electro-precipitation.

In the electro-precipitation of, for example, dust from gases, careful design of the electrode support structures is important. For example, problems may arise due to swinging movement of the discharge electrodes; this may lead to burning and breakage of discharge electrodes and poor discharge characteristics. Simplicity of construction and ease of manufacture, erection and maintenance are also important criteria for electrode support structures.

It is an object of the invention to provide an improved electro-precipitator electrode support structure.

The invention provides an electro-precipitator electrode support structure comprising a first framework adapted to support upper end portions of electrodes of an electro-precipitator electrode bank, a second framework adapted to support lower end portions of the electrodes, and bracing means securing the first framework to the second framework and adapted to minimise relative movement of the frameworks transversely of the bracing means, the bracing means comprising a bracing assembly which comprises (a) a plurality of straight elongated members secured to the frameworks and (b) a plurality of annular members extending transversely to the straight elongated members, the straight elongated members being secured to the annular members around the periphery of each annular member and adjacent annular members being interconnected by cross bracing.

The invention also provides an electro-precipitator discharge electrode support structure comprising a first framework adapted to support upper end portions of discharge electrodes of an electro-precipitator electrode bank, a second framework adapted to support lower end portions of the discharge electrodes, and bracing means securing the first framework to the second framework and adapted to minimise relative movement of the frameworks transversely of the bracing means in directions along the bank and across the bank, the bracing means lying generally within the cross-sectional area bounding the electrode bank when the bank is in use, and the bracing means comprising a bracing assembly which comprises (a) a plurality of parallel straight elongated members extending between the first framework and the second framework and secured to the frameworks and (b) a plurality of aligned annular members spaced along the straight elongated members and extending transversely thereto, the straight elongated members being secured to each annular member around the periphery thereof and adjacent annular members being interconnected by cross bracing.

The invention also provides an electro-precipitator electrode bank comprising a plurality of electrodes and a support structure, as set out in either of the last two preceding paragraphs, supporting said electrodes.

The invention also provides an electro-precipitator comprising an electrode bank as set out in the last preceding paragraph.

Each annular member is, for example, polygonal, e.g. rectangular.

There now follows a description, to be read with reference to the accompanying drawings, of an electro-precipitator embodying the invention. This description is given by way of example of the invention only and not by way of limitation thereof.

Figure 1:
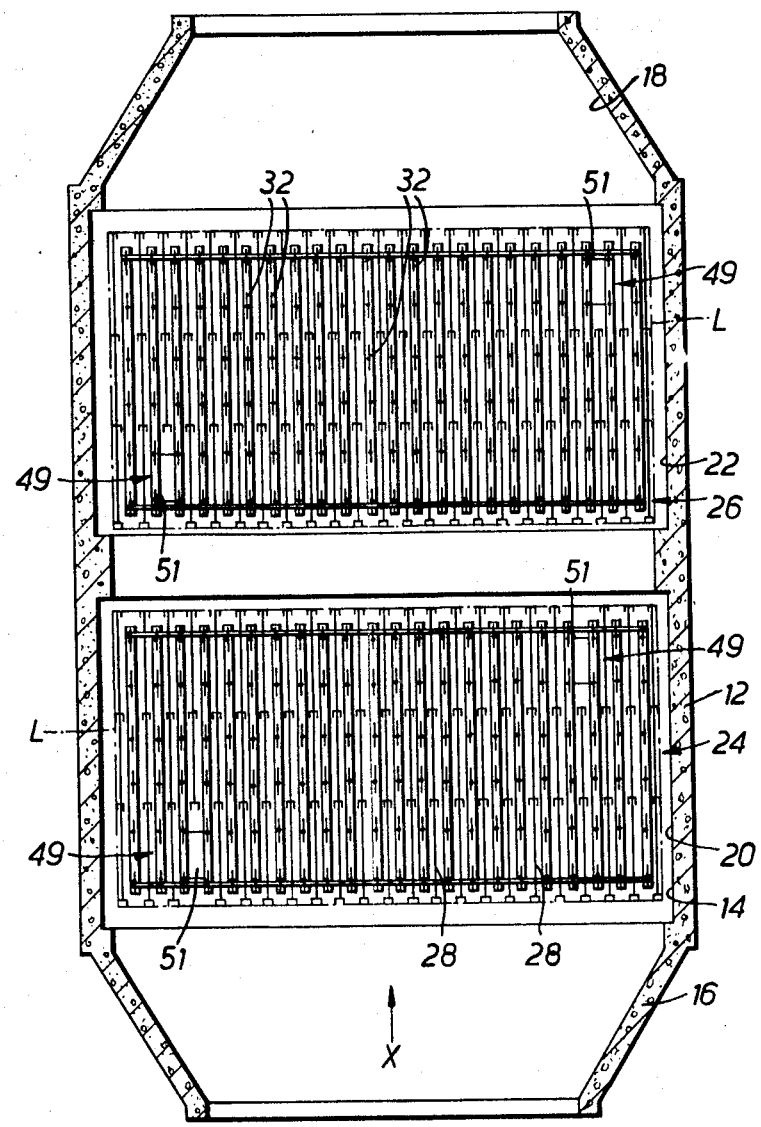
FIG. 1 shows a sectional plan view of the electro-precipitator embodying the invention.
Figure 2:
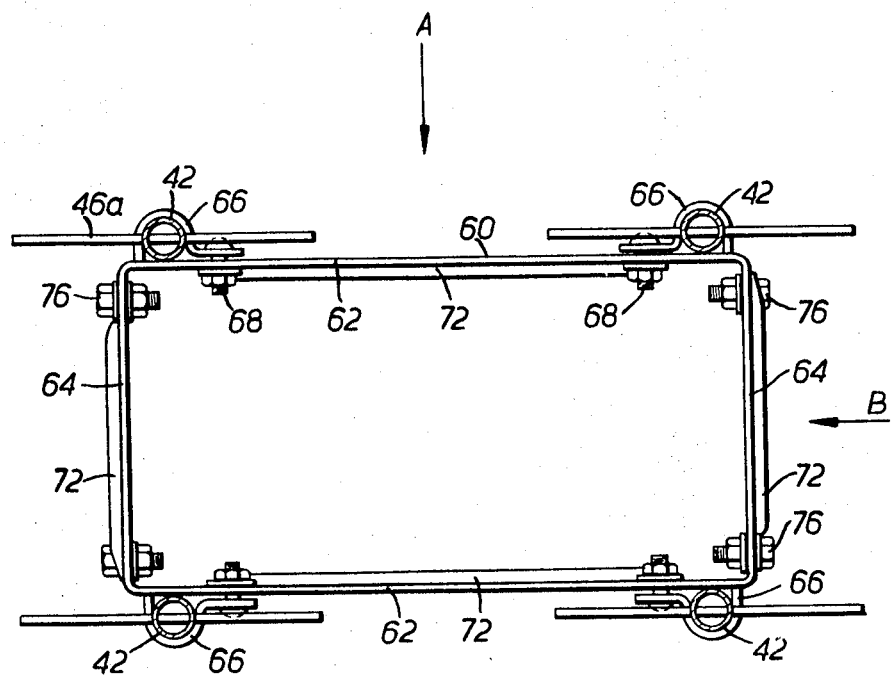
FIG. 2 shows an enlarged sectional plan view of parts shown in FIG. 1.

The precipitator embodying the invention comprises a large casing 12 adapted to provide a treatment chamber 14 for the precipitation of dust from gas flowing through the chamber 14 from an inlet 16 to an outlet 18. In the operation of the precipitator, dust-laden gas to be treated flows in a generally horizontal direction through the treatment chamber 14 (the direction of the arrow X in FIG. 1).

The treatment chamber 14 comprises two communicating portions 20, 22 in which are provided electrode banks 24, 26 respectively; the electrode banks 24, 26 are spaced apart between the portions 20, 22.

Each electrode bank 24, 26 comprises a plurality of vertical dust collector electrode plate members 28 and a plurality of elongated vertical discharge electrodes 32. A planar row of the discharge electrodes 32 is provided midway between each pair of adjacent plate members 28. In the operation of the precipitator the plate members 28 are earthed and the discharge electrodes 32 are charged to a high potential; as a result dust is precipitated from the gas and collects on the plate members 28. The precipitator also comprises rapping mechanism (not shown) adapted to dislodge the collected dust from the plate members 28. The rapping mechanism is of known type and details thereof form no part per se of the present invention.

Figure 3:
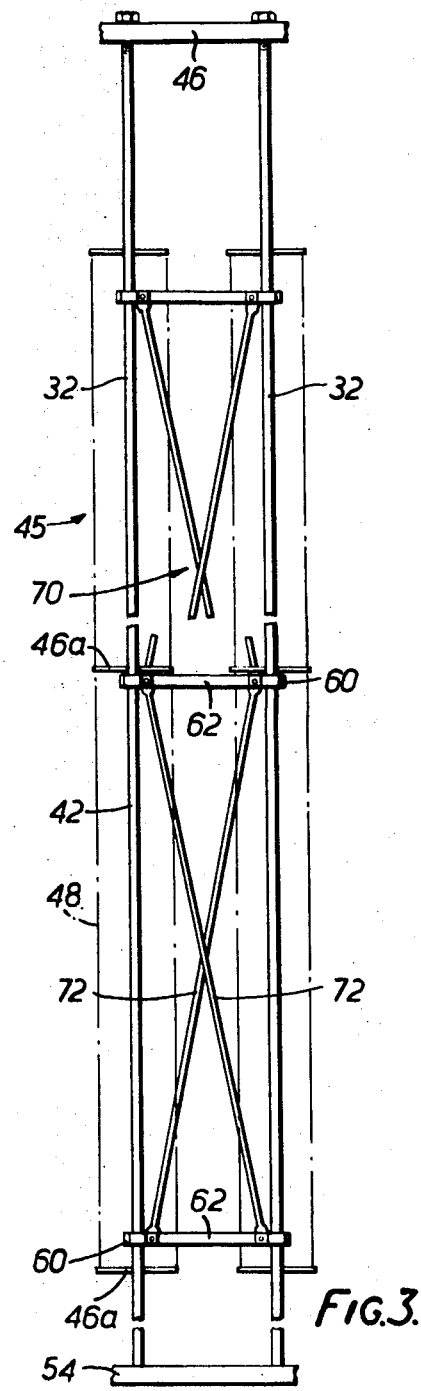
FIG. 3 shows a side view generally in the direction of the arrow A of FIG. 2.
Figure 4:
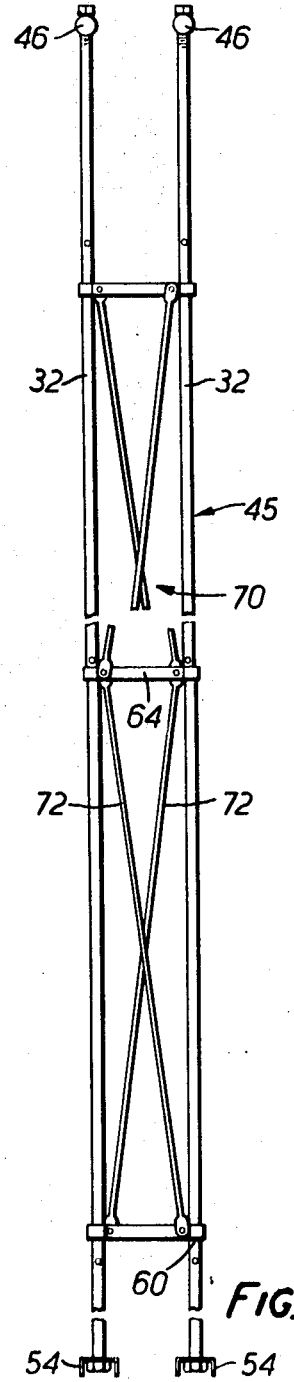
FIG. 4 shows a side view generally in the direction of the arrow B of FIG. 2.

Each electrode bank 24, 26 comprises a discharge electrode support structure 45 comprising a first, upper, framework 46 (FIGS. 3 and 4, only part of which is shown) and a second, lower, framework 54 (only part of which is shown); and the frameworks 46, 54 of said bank support the upper and lower end portions, respectively, of the discharge electrodes 32 of the bank.

Each electrode support structure 45 also comprises bracing means 49 (FIG. 1) securing the framework 46 to the framework 54 and adapted to minimise relative swinging movement of the frameworks 46, 54 transversely of the bracing means 49 in the direction of the arrow X and at right angles thereto, and also adapted to minimise relative torsional movement of the frameworks 46, 54 transversely of the bracing means 49; the bracing means of each structure 45 comprises two bracing assemblies 51 which are spaced apart, and in cross-section are offset from each other both transversely and longitudinally of the bank 24, 26.

The bracing assemblies 51 of each bank 24, 26 lie within the cross-sectional area (indicated by chain line L in FIG. 1) bounding the bank, and also lie adjacent the periphery of said cross-sectional area where said periphery is transverse to the direction of gas flow through the bank, whereby the assemblies 51 are readily accessible for maintenance purposes. Also the bracing assemblies 51 of the bank 24 are in cross-section generally offset transversely of the bank 24 with respect to the bracing assemblies of the bank 26, to minimise interference with gas flow, by the assemblies 51, in any particular gas path through the precipitator.

Each discharge electrode 32 comprises a central straight vertical support tube 42 of uniform circular cross-section; secured in the tube 42 are a plurality of horizontal co-extensive uniformly spaced cross members 46a which extend in the direction of gas flow; the cross members 46a support two long vertical twisted wires 48 which are uniformly spaced from the tube 42. The tube 42 is firmly secured to the upper and lower frameworks 46, 54.

Each bracing assembly 51 comprises four adjacent tubes 42 of the discharge electrodes which in cross-section lie at the corners of a rectangle which is elongated in the direction of gas flow. The bracing assembly 51 also comprises a plurality of aligned rectangular annular members 60 which are spaced along the tubes 42 and each of which extends in a horizontal plane. The four tubes 42 are secured to each annular member 60 around the outer periphery thereof. The annular member 60 comprises two longer sides 62 and two shorter sides 64. Two of the four tubes 42 are secured to each longer side 62 adjacent opposite end portions thereof by bolted clips 66 each of which is bolted to the appropriate side 62 by a bolt 68 and a corresponding nut.

Each pair of adjacent annular members 60 are interconnected by cross-bracing 70. The cross-bracing 70 connecting said pair of members 60 comprises four tubes 72. Each tube 72 lies generally in a vertical plane and connects a side 62 or 64 of one annular member 60 to a corresponding side 62 or 64 of an adjacent annular member; the corresponding sides 62 or 64 which are connected by a tube 72 lie in the same vertical plane. Each tube 72 which connects two sides 62 is secured to said sides 62 by the bolts 68 and the corresponding nuts and each tube 72 which connects two side 64 is secured to said sides 64 by bolts 76 and corresponding nuts. Opposite tubes 72 are inclined in opposed directions, and adjacent tubes 72 extending downwardly and upwardly from the same annular member 60 are also inclined in opposed directions, and are secured to the annular member 60 by the same bolt 68 or 76 and corresponding nut.

In a modification (not shown) the discharge electrodes 32 are replaced by weighted wire discharge electrodes of known type per se, in which case the tubes 42 of the bracing assemblies are provided independently of the discharge electrodes. Alternatively, for example, discharge electrodes 32 are used where the tubes 42 are required and said weighted wire discharge electrodes to provide the remaining discharge electrode requirement; in this case of course the tubes 42 are provided by the discharge electrodes 32.

I claim:

1. An electro-precipitator electrode support structure comprising:

a first framework adapted to support upper end portions of a multiplicity of electrodes of an electro-precipitator electrode bank, a second framework adapted to support lower end portions of said electrodes, and bracing means securing the first framework to the second framework and adapted to minimise relative movement of the framework transversely of the bracing means, the bracing means comprising a bracing assembly which comprises:

(a) at least four straight elongated substantially parallel members secured to said frameworks, (b) a plurality of annular members extending transversely to the straight elongated members, (c) means securing the straight elongated members to the annular members around the periphery of each annular member and (d) cross bracing interconnecting adjacent annular members at each side of said bracing means.

2. A structure according to claim 1 wherein each annular member is polygonal.

3. A structure according to claim 2 wherein each annular member is rectangular.

4. A structure according to claim 1 wherein the bracing assembly comprises four of said straight elongated members which in cross-section lie at the four corners of a rectangle.

5. A structure according to claim 1 wherein each of said straight elongated members is provided by a support member of a discharge electrode which electrode is adapted to form an operative part of the bank.

6. A structure according to claim 1 wherein the bracing means is adapted to lie adjacent the periphery of said cross-sectional area where said periphery is transverse to the direction of gas flow through the bank.

7. A structure according to claim 1, wherein the bracing means in each bank comprises a plurality of spaced apart bracing assemblies including at least two bracing assemblies which in cross section are offset from each other both transversely and longitudinally of the bank.

8. An electro-precipitator discharge electrode support structure comprising:

a first framework adapted to support upper end portions of discharge electrodes of an electro-precipitator electrode bank, a second framework adapted to support lower end portions of the discharge electrodes, and bracing means securing the first framework to the second framework and adapted to minimise relative movement of the frameworks transversely of the bracing means in directions along the bank and across the bank, the bracing means being adapted to lie generally within the cross-sectional area bounding the electrode bank, and the bracing means comprising a bracing assembly which comprises:

(a) at least four longitudinally rigid substantially parallel straight elongated members extending between the first framework and the second framework, (b) means securing said members to the frameworks, (c) a plurality of aligned annular members spaced along the straight elongated members and extending transversely thereto, (d) means securing the straight elongated members to each annular member around the periphery of each annular member and (e) cross bracing interconnecting adjacent annular members along each side of said bracing means.

9. An electro-precipitator comprising a plurality of electrode banks, each of said banks comprising a plurality of electrodes and an electro-precipitator electrode support structure comprising:

a first framework adapted to support upper end portions of the electrodes of that bank, a second framework adapted to support lower end portions of the electrodes of that bank, and bracing means securing the first framework to the second framework and adapted to minimize relative movement of the frameworks transversely of the bracing means, the bracing means comprising:

(a) a plurality of straight elongated members secured to the frameworks,
(b) a plurality of annular members extending transversely to the straight elongated members,
(c) means securing the straight elongated members to the annular members around the periphery of each annular member,
(d) cross bracing interconnecting adjacent annular members, and
(e) the bracing means of each bank being in cross-section offset transversely of the bank with respect to the bracing means of each other bank.

10. An electro-precipitator comprising (a) a casing having a gas inlet and a gas outlet (b) a plurality of electrode banks, and (c) means for mounting the electrode banks in the casing, each electrode bank comprising a plurality of spaced planar collector electrodes and a plurality of discharge electrodes located between adjacent collector electrodes, the mounting means comprising discharge electrode support structures one for each bank and each comprising:

a first framework adapted to support upper end portions of the discharge electrodes,
a second framework adapted to support lower end portions of the discharge electrodes, and
bracing means securing the first framework to the second framework and adapted to minimise relative movement of the frameworks transversely of the bracing means in directions along the bank and across the bank, said bracing means being adapted to lie generally within the cross-sectional area bounding the electrode bank and adjacent the periphery of said cross-sectional area where said periphery is transverse to the direction of gas flow through the bank, and the bracing means comprising a plurality of spaced apart bracing assemblies which are offset from each other both transversely and longitudinally of the bank and each of which comprises:

a plurality of parallel straight elongated members extending between the first framework and the second framework, means securing said members to the frameworks,
a plurality of aligned substantially rectangular annular members spaced along the straight elongated members and extending transversely thereto,
means securing the straight elongated members to each annular member around the periphery thereof and
cross bracing interconnecting adjacent annular members,
the bracing means of each bank being in cross-section offset with respect to the bracing means of the other bank.

11. An electro-precipitator according to claim 10, wherein the cross bracing interconnecting two adjacent annular members comprises four inclined straight bracing members each lying in a vertical plane and connecting corresponding sides of the annular members, said corresponding sides lying in the same vertical plane as the connecting straight bracing member, opposite bracing members being oppositely inclined, and adjacent bracing members which extend downwardly and upwardly from the same annular member also being oppositely inclined.

References Cited

UNITED STATES PATENTS

| | | | |
|---|---|---|---|
| 1,235,332 | 7/1917 | Lachman | 52—648 |
| 1,773,030 | 8/1930 | Connely et al. | 52—648X |
| 1,903,640 | 4/1933 | Wintermute | 55—112 |
| 2,175,983 | 10/1939 | Walsh | 52—648X |
| 2,369,877 | 2/1945 | White | 55—141X |
| 2,999,561 | 9/1961 | Phyl | 55—147 |
| 3,485,011 | 12/1969 | Archer et al. | 55—148X |

FOREIGN PATENTS

| | | | |
|---|---|---|---|
| 811,950 | 8/1951 | Germany | 55—140 |
| 540,918 | 11/1941 | Great Britain | 55—148 |
| 729,592 | 5/1955 | Great Britain | 55—150 |

DENNIS E. TALBERT, JR., Primary Examiner

U.S. Cl. X.R.

52—648; 55—151